United States Patent

Takahashi et al.

[11] Patent Number: 5,820,010
[45] Date of Patent: Oct. 13, 1998

[54] FLYWHEEL DEVICE HAVING METAL DISK AND RESIN PORTION AND METHOD OF PRODUCING THE FLYWHEEL DEVICE

[75] Inventors: Junya Takahashi; Yutaka Hino, both of Yokohama, Japan; Kazuo Hatsumi, Brownsville, Tex.; Takashi Ichihara, Machida, Japan

[73] Assignee: Matsushita Electric Industrial Co., Ltd., Osaka, Japan

[21] Appl. No.: 833,224

[22] Filed: Apr. 14, 1997

Related U.S. Application Data

[63] Continuation of Ser. No. 385,686, Feb. 8, 1995, abandoned.

[30] Foreign Application Priority Data

Feb. 16, 1994 [JP] Japan ..................................... 6-019340

[51] Int. Cl.$^6$ .................................................. B65H 20/00
[52] U.S. Cl. ........................................... 226/190; 226/188
[58] Field of Search ..................................... 226/190, 194, 226/188, 168; 74/572; 464/147, 55, 156, 98, 80, 96, 94, 99; 474/166, 190, 178

[56] References Cited

U.S. PATENT DOCUMENTS

| 3,754,696 | 8/1973 | Rietbergen | 74/572 X |
| 4,036,080 | 7/1977 | Friedericy et al. | |
| 4,660,435 | 4/1987 | Davis et al. | 74/572 |
| 4,741,224 | 5/1988 | Arata | 74/572 |
| 4,860,611 | 8/1989 | Flanagan et al. | 74/572 X |
| 5,224,642 | 7/1993 | Davis et al. | 226/190 |

FOREIGN PATENT DOCUMENTS 2217810  11/1989  United Kingdom ..................... 74/572

*Primary Examiner*—John P. Darling
*Assistant Examiner*—William R. Rivera
*Attorney, Agent, or Firm*—Stevens, Davis, Miller & Mosher, L.L.P.

[57] ABSTRACT

A flywheel device for use in a magnetic recording/reproducing unit or the like which device is simple in construction, and can be produced at low costs, and a method of making it. A capstan shaft is press-fitted in a hole formed in a central portion of a metal disk, and then a resin is filled on an outer peripheral portion and a central portion of the disk by outsert molding to form an outer peripheral resin portion and a central resin portion. The outer peripheral resin portion has a groove formed in an outer periphery thereof, and the central resin portion has gear portions.

5 Claims, 5 Drawing Sheets

5,820,010

FLYWHEEL DEVICE HAVING METAL DISK AND RESIN PORTION AND METHOD OF PRODUCING THE FLYWHEEL DEVICE

This application is a continuation of application Ser. No. 08/385,686, filed Feb. 8, 1995 (abandoned).

BACKGROUND OF THE INVENTION

This invention relates to a flywheel device used in a magnetic recording/reproducing unit for smoothly driving a magnetic tape, and also relates to a method of producing such a flywheel device.

FIG. 5 shows an audio cassette used, for example, in a magnetic recording/reproducing unit (including a reproduction-only unit) for mounting on a car. In FIG. 5, reels 2A and 2B are rotatably supported within a cassette body 1, and a magnetic tape 3 is wound on the reels 2A and 2B. Cassette-positioning holes 4A and 4B are formed adjacent to a front side of the body 1, and holes 5A and 5B for respectively receiving capstan shafts are also formed adjacent to the front side of the body 1.

FIG. 6 shows an important portion of the magnetic recording/reproducing unit for mounting on a car. In FIG. 6, cassette guide members 7A and 7B are supported respectively on opposite side walls of a base plate 6 for upward and downward movement. The cassette shown in FIG. 5 is horizontally inserted while being guided by the cassette guide members 7A and 7B. When the cassette is inserted into a predetermined position while being guided by the cassette guide members 7A and 7B, a plunger 8 is operated to drive the cassette guide members 7A and 7B to move them downward toward the base plate 6, thereby moving the cassette into a recording/reproducing position. Cassette-positioning pins 9A and 9B are fixedly secured to the base plate 6. The capstan shafts 10A and 10B are rotatably supported respectively by bearings fixedly mounted on the base plate 6. A flywheel is fixedly secured to a lower end of each of the capstan shafts 10A and 10B. A slide plate 11 is slidably supported on the base plate 6, and a magnetic head 12 is supported on the slide plate 11. Reel drive shafts 13A and 13B are engaged respectively with the reels 2A and 2B in the cassette, and drive the reels 2A and 2B for rotation by a rotational drive force applied by a motor 14.

In FIG. 6, when the cassette, inserted into the cassette guide members 7A and 7B, reaches the predetermined position, the plunger 8 is operated to drive the cassette guide members 7A and 7B to move them downward. As a result, the cassette-positioning pins 9A and 9B are inserted into the cassette-positioning holes 4A and 4B, respectively, and the capstan shafts 10A and 10B are inserted respectively into the holes 5A and 5B in the cassette, and also the reel drive shafts 13A and 13B are engaged with the reels 2A and 2B of the cassette, respectively. When the cassette is thus transferred to the recording/reproducing position by the cassette loading mechanism, the slide plate 11 slides to bring the magnetic head 12 into contact with the magnetic tape, and also the reel drive shafts 13A and 13B are rotated by the rotational drive force of the motor 14, so that the reels 2A and 2B, engaged respectively with the reel drive shafts 13A and 13B, are rotated, thereby effecting a reproducing operation or a recording operation. The rotational drive force of the motor 14 is transmitted to the flywheels through respective belts to rotate the flywheels, and the capstan shafts 10A and 10B, fixedly secured respectively to these flywheels, are also rotated, and the magnetic tape is caused to travel by the rotating capstan shafts 10A and 10B and pinch rollers.

FIG. 7 shows the above flywheel. The flywheel 15 shown in FIG. 7 is molded of a resin containing metal powder. The metal powder is included in the molding resin so as to provide a required inertia moment during the rotation of the flywheel 15. A groove 16 of a V-shaped cross-section is formed in a peripheral surface (edge) of the flywheel 15, and the belt is engaged in this groove 16. Gear portions 17 and 18 are formed integrally on an upper surface of the flywheel 15. A rotational drive force of the gear portion 17 is transmitted to the reel drive shaft 13, (13B) via other gears to rotate the same. At the time of a fast-forward operation and a rewind operation, a rotational drive force of the gear portion 18 is transmitted to the reel drive shaft 13A, (13B) via other gears to rotate the same. The capstan shaft 10A, (10B) is press-fitted in a central portion of the flywheel 15. FIGS. 8A, 8B and 8C show a process of producing the flywheel 15. First, the resin, containing metal powder, is molded to form the flywheel 15 having the integral gear portions 17 and 18, as shown in FIG. 8A. Then, a cylindrical bushing 20 of metal is press-fitted in a hole 19 formed in a central portion of a lower surface of the flywheel 15, as shown in FIG. 8B. Then, the capstan shaft 10A, 10B is press-fitted in a central hole 21 of the flywheel 15 and the bushing 20, thereby completing the flywheel, as shown in FIG. 8C. In the above conventional flywheel device, the special resin containing the metal powder for obtaining the required inertia moment is used, and the metal bushing 20 is used for firmly fastening the capstan shaft 10A, (10B) to the flywheel 15, and therefore there has been encountered a problem that the conventional flywheel device is expensive.

SUMMARY OF THE INVENTION

This invention has been made in order to overcome the above problem of the prior art, and an object of the invention is to provide a flywheel device which is simple in construction and can be produced at low costs.

Another object of the invention is to provide a method of producing such a flywheel device.

According to a first aspect of the present invention, there is provided a flywheel device comprising a disk of metal, a capstan shaft press-fitted in a hole formed in a central portion of the disk, and a resin portion formed at an outer peripheral portion of the disk by filling a resin on the outer peripheral portion, the resin portion having a groove formed in an outer peripheral surface thereof.

According to a second aspect of the invention, there is provided a flywheel device comprising a disk of metal having a hole formed in a central portion of the disk, a hollow cylindrical portion formed on the disk around a peripheral edge of the hole, a capstan shaft press-fitted in the hole in the disk, and a resin portion formed at an outer peripheral portion of the disk by filling a resin on the outer peripheral portion, the resin portion having a groove formed in an outer peripheral surface thereof.

According to a third aspect of the invention, there is provided a method of producing a flywheel, comprising the steps of press-fitting a capstan shaft in a hole formed in a central portion of a disk of metal; and filling a resin on an outer peripheral portion of the disk to form a resin portion, the resin portion having a groove formed in an outer peripheral surface thereof.

With the above construction of the first aspect of the invention, the metal disk is used as a core material, and therefore a required inertia moment can be obtained without the use of a resin-molded product containing metal powder as in the conventional construction. Moreover, since the capstan shaft is press-fitted in the central hole in the metal disk, the capstan shaft can be firmly fixed without the use of a bushing as in the conventional construction.

In the second aspect of the invention, the hole is formed in the central portion of the metal disk, and the hollow cylindrical portion is formed around the peripheral edge of this hole. Therefore, the area of contact between the capstan shaft (press-fitted in this central hole) and the disk is larger, so that the capstan shaft can be more firmly fixed to the disk.

In the third aspect of the invention, the flywheel device can be produced merely by filling the resin after the capstan shaft is press-fitted in the metal disk serving as a core material, and the step of press-fitting the bushing in the conventional process is unnecessary.

DESCRIPTION OF THE PREFERRED EMBODIMENTS

Figure 1:
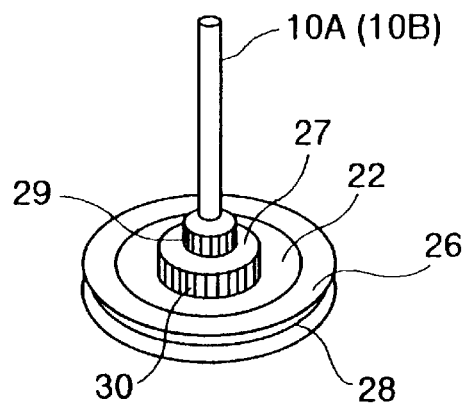
FIG. 1 is a perspective view of one preferred embodiment of a flywheel device of the present invention.
Figure 2A:
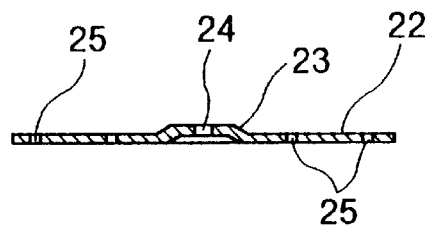
FIGS. 2A to 2C are views showing a process of producing the flywheel device.
Figure 2B:
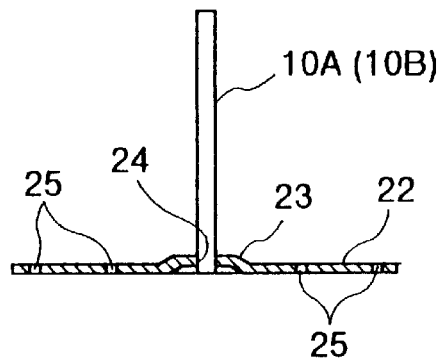
Figure 2C:
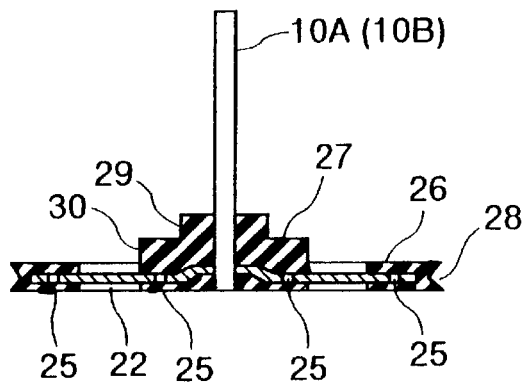
Figure 3:
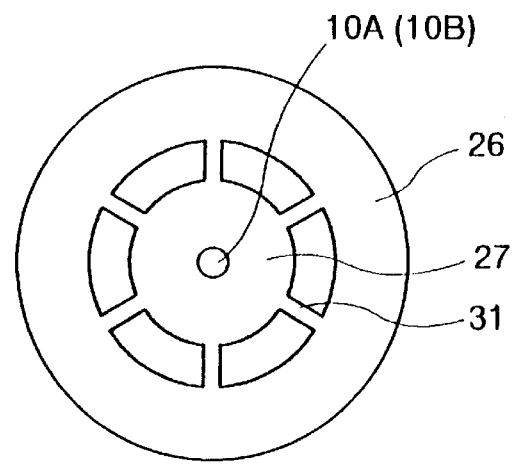
FIG. 3 is a bottom view of the flywheel device.

One preferred embodiment of the present invention will now be described with reference to FIGS. 1 to 3. FIG. 1 shows one preferred embodiment of a flywheel device of the present invention, FIGS. 2A to 2C shows a process of producing the flywheel device, and FIG. 3 is shows a lower surface of the finished flywheel device. In FIG. 2A, a projected portion 23 is formed at a central portion of a disk 22 of metal, and a hole 24 is formed through this projected portion 23. A plurality of small holes 25 are formed through the disk 22. As shown in FIG. 2B, a capstan shaft 10A, (10B) is press-fitted in the central hole 24 in the disk 22 processed or worked as shown in FIG. 2A. Then, a resin is filled or applied by outsert molding onto upper and lower surfaces of an outer peripheral portion of the disk 22 and upper and lower surfaces of the central portion of the disk 22, thereby forming an outer peripheral resin portion 26 and a central resin portion 27, as shown in FIG. 2C. In this outsert molding operation, the disk 22, having the capstan shaft 10A (10B) press-fitted therein (as shown in FIG. 2B), is set in a mold for the resin, and then the resin is poured into this mold. At a result of carrying out this outsert molding, a groove 28 of a V-shaped cross-section is formed in an outer peripheral surface of the outer peripheral resin portion 26, and also gear portions 29 and 30 are formed on the central resin portion 27. During this outsert molding, the resins filled respectively on the upper and lower surfaces of the disk 22 are joined together through the small holes 25 formed through the disk 22. As shown in FIG. 3, interconnecting resin portions 31 interconnect the outer peripheral resin portion 26 and the central resin portion 27 at the lower surface of the disk 22.

Figure 6:
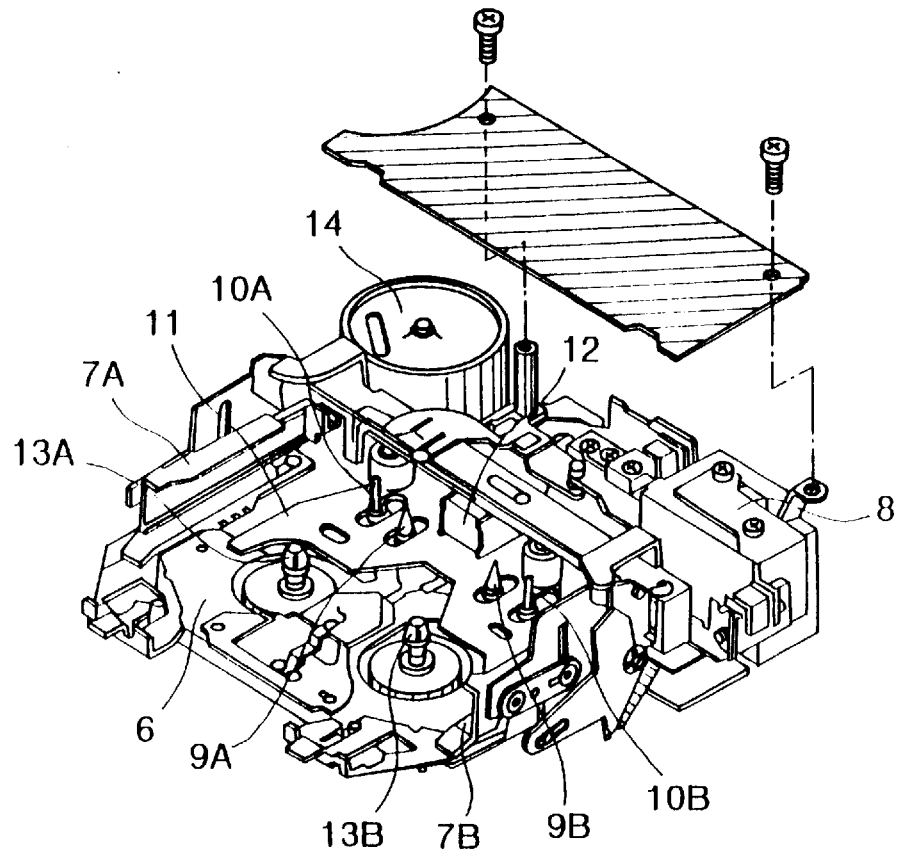
FIG. 6 is a perspective view of a portion of a conventional magnetic recording/reproducing unit.
Figure 7:
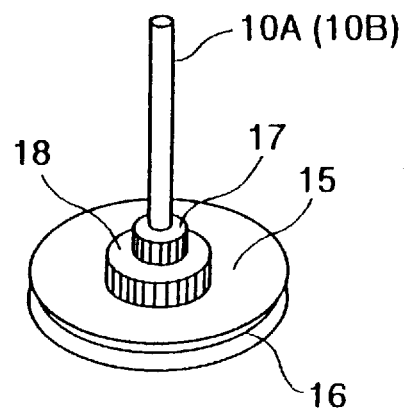
FIG. 7 is a perspective view of a conventional flywheel device.
Figure 8A:
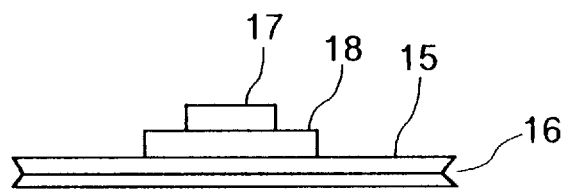
FIGS. 8A to 8C are views showing a process of producing the conventional flywheel device.
Figure 8B:
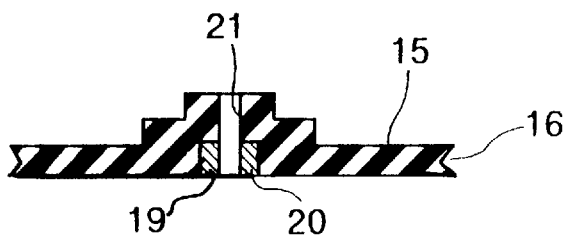
Figure 8C:
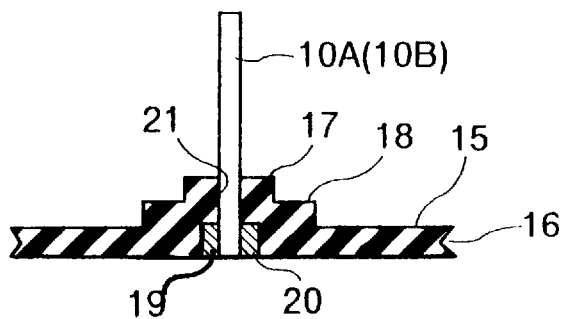

The flywheel device shown in FIG. 1 is rotatably supported on a base plate (as at 6 in FIG. 6) by a bearing fixedly mounted on the base plate, and a rotational drive force of a motor is transmitted via a belt to the flywheel to rotate the same.

As described above, in this embodiment, the disk 22 of metal is used as a core material of the flywheel, and therefore a required inertia moment can be obtained without the use of the special resin containing the metal powder as in the conventional flywheel. Moreover, since the capstan shaft 10A, (10B) is press-fitted in the metal disk 22 serving as the core material, the capstan shaft 10A, (10B) can be firmly fixed without the use of the bushing 20 as in the conventional flywheel. Furthermore, since any metal powder does not need to be contained in the resin to be used for the outsert molding shown in FIG. 2C, the flywheel of this embodiment can be produced at lower costs.

Figure 4A:
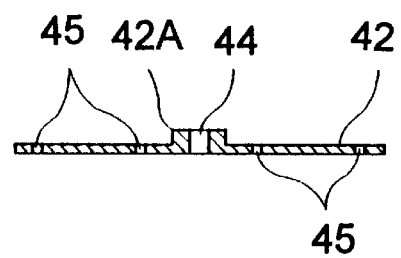
FIGS. 4A to 4C are views showing a process of producing another preferred embodiment of a flywheel device of the invention.
Figure 4B:
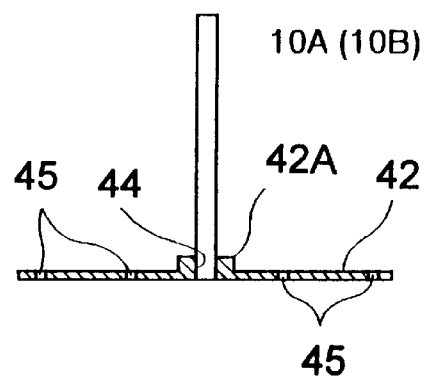
Figure 4C:
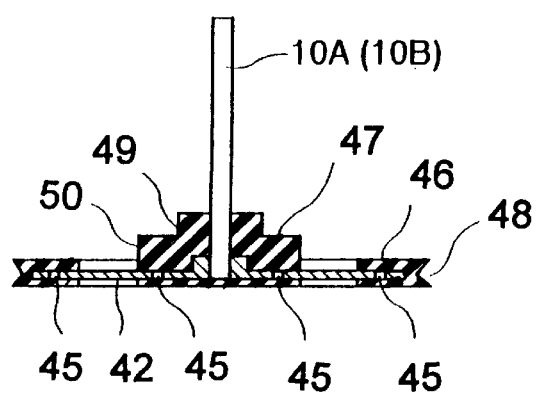
Figure 5:
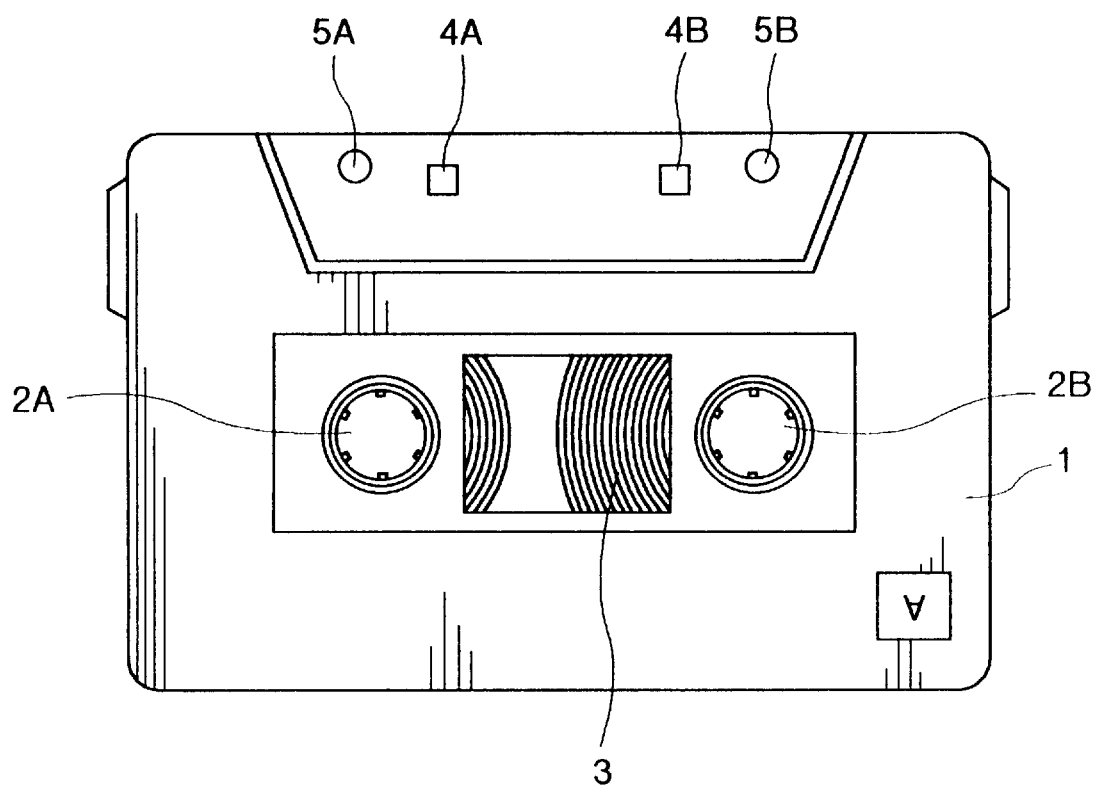
FIG. 5 is a plan view of a cassette.

FIGS. 4A to 4C show another preferred embodiment of the invention. This embodiment is characterized in that a hole 44 is formed through a central portion of a disk 42, and that a hollow cylindrical portion 42A, projecting upwardly, is formed by drawing (beading) on an upper surface of the disk 42 around a peripheral edge of the hole 44. The capstan shaft 10A, (10B) is press-fitted in the central hole 44 as shown in FIG. 4B, and then as shown in FIG. 4C, an outer peripheral resin portion 46, a central resin portion 27 and interconnecting resin portions not shown are formed by outsert molding as in the preceding embodiment shown in FIG. 2. Holes 45, groove 48 and gear portions 49, 50 are similar to holes 25, groove 28 and gear portions 29, 30 of the preceding embodiment. In this embodiment, the area of contact between the capstan shaft 10A, (10B) (press-fitted in the central hole 44) and the disk 42 is larger, and therefore there is achieved an advantage that the capstan shaft 10A (10B) is fixed more firmly. In both embodiments, the central resin portion is in contact with the capstan shaft.

In the above construction of the present invention, the metal disk is used as the core material, and therefore there is achieved an advantage that the required inertia moment can be obtained without the use of a metal power-containing resin as in the conventional construction. Moreover, since the capstan shaft is press-fitted in the metal disk serving as the core material, the capstan shaft can be firmly fixed without the use of a bushing as in the conventional construction. In the second aspect of the invention, the hollow cylindrical portion is formed around the peripheral edge of the central hole in the disk, and therefore the area of contact between the capstan shaft (press-fitted in this central hole) and the disk is larger, thereby achieving an advantage that the capstan shaft can be more firmly fixed to the central portion of the disk. In the third aspect of the invention, the step of press-fitting a bushing in a resin-molded flywheel as in the conventional construction, as well as the step of press-fitting the capstan shaft in this bushing, is unnecessary, and the flywheel device of the invention can be produced easily at lower costs.

What is claimed is:

1. A flywheel device for use in a magnetic tape driving mechanism of a magnetic recording and reproducing unit, said flywheel device for being rotated by a motor and comprising:

a disk of metal having a hole formed in a central portion;

a capstan shaft press-fitted in said hole formed in said central portion of said disk for causing a magnetic tape to travel stably in cooperation with a pinch roller;

a resin portion which is formed at an outer peripheral portion of said disk and which does not contain metal powder, said resin portion having a groove formed in an outer peripheral surface thereof; and a central resin portion formed on the central portion of said disk, wherein a gear portion is formed on said central resin portion.

2. A flywheel device according to claim 1, in which said outer peripheral portion of said disk has upper and lower surfaces and has a plurality of further holes formed through said disk, and in which the resin portion comprises portions which are respectively formed on upper and lower surfaces of the outer peripheral portion of said disk and which are joined together through said plurality of further holes formed through said disk.

3. A flywheel device according to claim 1, wherein the central resin portion is in contact with the capstan shaft.

4. A flywheel device for use in a magnetic tape driving mechanism of a magnetic recording and reproducing unit, said flywheel device for being rotated by a motor and comprising:

a disk of metal having a hole formed in a central portion of said disk;

a hollow cylindrical portion formed on said disk around a peripheral edge of said hole;

a capstan shaft press-fitted in said hole in said disk for causing a magnetic tape to travel stably in cooperation with a pinch roller;

a resin portion which is formed at an outer peripheral portion of said disk and which does not contain metal powder, said resin portion having a groove formed in an outer peripheral surface thereof; and a central resin portion formed on the central portion of said disk, wherein a gear portion is formed on said central resin portion.

5. A flywheel device according to claim 4, wherein the central resin portion is in contact with the capstan shaft.

* * * * *